April 18, 1933.  C. N. McDAVITT  1,904,497
MOTOR STARTER
Filed Oct. 15, 1931
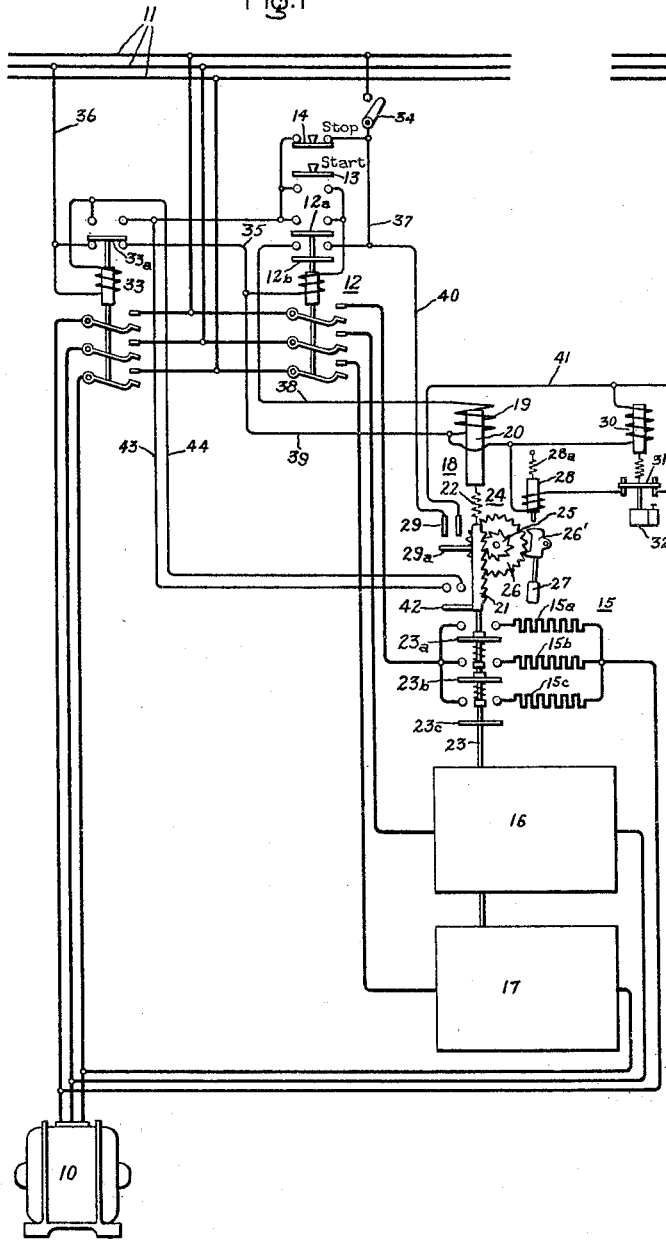
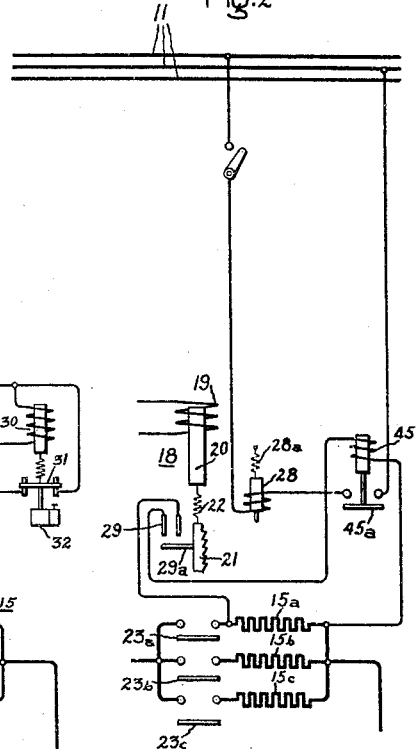
Inventor:
Carlisle N. McDavitt,
by Charles E. Tullar
His Attorney.

Patented Apr. 18, 1933                                                   1,904,497

UNITED STATES PATENT OFFICE

CARLISLE N. McDAVITT, OF SCHENECTADY, NEW YORK, ASSIGNOR TO GENERAL ELECTRIC COMPANY, A CORPORATION OF NEW YORK

MOTOR STARTER

Application filed October 15, 1931. Serial No. 569,012.

This invention relates to control systems, more particularly to systems for controlling the starting and acceleration of electric motors and it has for an object the provision of a simple, reliable and improved system of this kind.

More specifically the invention relates to systems employed to start electric motors which are supplied from networks carrying both lighting and motor loads. An object of the invention is to limit the starting current drawn from the network to predetermined maximum increments in definite intervals of time. A further object of the invention is to arrest the action of the starting device as the motor breaks from rest so as to allow the motor to accelerate to the point at which the developed torque is equal to the torque demanded by the load, and thereafter to cause the starter to accelerate the motor to full running speed.

In carrying this invention into effect in one form thereof, a device is provided for varying the current supplied to the motor in a series of increments together with means for arresting the action of the current varying device at an intermediate point in its operation.

More specifically a switching device is employed to vary the starting resistance in a series of steps such that the motor current is increased in a series of predetermined increments which are separated from each other by a time interval determined by a suitable time element device. Means are also provided for temporarily interrupting this action of the switching device as the motor breaks from rest and starts to rotate so as to allow the motor to accelerate to a speed at which the torque developed by the motor is equal to that demanded by the load, and means are also provided for thereafter causing the switching device to resume its operation of cutting out the starting resistance in predetermined steps until the motor attains full speed.

For a better and more complete understanding of the invention, reference should now be had to the following specification and to the accompanying drawing in which Fig. 1 is a simple diagrammatical illustration of an embodiment of the invention and Fig. 2 is a modification.

Referring now to the drawing an electric motor 10, illustrated in the drawing as an alternating current induction motor is supplied from any suitable source such for example as that represented by the three supply lines 11 to which the terminals of the motor are arranged to be connected by any suitable connecting means such as the line contactor 12, the operation of which is under the control of suitable manually operated contact devices 13 and 14. Although the contact devices 13 and 14 may be of any suitable kind, they are preferably of the push button type; the push button 13 being illustrated as being normally open and the push button 14 being illustrated as normally closed.

Suitable current limiting devices illustrated in the drawing as groups of parallel connected resistances 15, 16 and 17 are included in the connections between the line contactor 12 and the respective phase terminals of the motor 10. Since the resistance groups 15, 16 and 17 are in all respects identical only the group 15 has been illustrated in detail; the groups 16 and 17 being shown conventionally for the purpose of simplification.

Resistance group 15 is shown as comprising a plurality of separate resistance units $15_a$, $15_b$ and $15_c$, the right-hand terminals of which are connected together at a common point and the left-hand terminals of which are shown as open end connections. Although but three separate resistance sections are shown in the group 15 it will of course be understood that a larger number of sections may be and usually is employed. A small number of resistances will serve, however, to illustrate the operation of the invention and is, therefore, chosen in the interests of simplicity.

A suitable electromagnetic switching device 18 is provided for completing the connections between the resistance groups 15, 16 and 17 and the line contactor 12 and for sequentially connecting the separate resistances $15_a$, $15_b$ and $15_c$ etc. of each group in parallel with each other. The electromagnetic switching device 18 is shown as comprising an operating winding 19, a magnetic core member 20, a ratchet member 21 which is attached to the core member 20 by means of a resilient connection such for example as the spring 22 and a connecting rod 23 attached to the ratchet member 21 and upon which are arranged a plurality of movable contact members $23_a$, $23_b$ and $23_c$. As shown the movable contact members $23_a$, $23_b$ and $23_c$ are arranged on the connecting rod 23 at increasing distances from each other so that they engage their cooperating stationary contacts sequentially in response to upward movement of the rod 23. The ohmic values of the resistance sections $15_a$, $15_b$ and $15_c$ are so chosen that the motor starting current is varied in a series of substantially equally valued increments as the various sections of the starting resistance are added in parallel to each other. As an example, the resistance sections may be so chosen that the starting current will be increased in steps of 100 amperes each time that a section of resistance is added in parallel with those already in circuit.

In order to introduce a suitable time interval between each of the increments of motor starting current a suitable time element device 24 is provided for retarding the closing motion of the movable contacts $23_a$, $23_b$, $23_c$, etc. This time element device 24 is illustrated as a pendulum controlled escapement device and is shown as comprising a small pinion 25 provided with one way teeth which engage with the one way teeth of the ratchet member 21, a large escapement wheel 26 (either geared to the ratchet wheel 25 or mounted on the same shaft therewith), and an oscillating escapement pawl 26′ the period of oscillation of which may be adjusted as desired by means of a pendulum 27 of adjustable length. It will thus be seen that the upward or closing motion of the contact members is retarded by the escapement mechanism and that the downward or opening motion is unopposed since the one way teeth of the ratchet member 21 slide inoperatively over the one way teeth of the ratchet wheel 25 in the downward direction.

A holding relay 28 shown as comprising a plunger and an operating winding serves to stop the action of the escapement mechanism at an intermediate point in its operation, thus arresting the action of the movable contact members $23_a$, $23_b$ and $23_c$. The plunger of the relay 28 is normally biased out of engagement with the pawl 26′ so as not to interfere with the operation of the escapement mechanism. When the operating winding of the relay is energized, however, the plunger is forced into engagement with the pawl 26′ thus stopping the timing action of the escapement mechanism and interrupting the closing motion of the movable contact members. The energization of the operating winding of the relay 28 is controlled by means of a pair of stationary contacts 29 and a cooperating movable contact member $29_a$ carried upon the movable member 21 or arranged on any other suitable part of the switching mechanism so as to move in accordance with the motion of the contact members $23_a$, $23_b$ and $23_c$. The relative positions of the movable contact member $29_a$ and its cooperating stationary contacts 29 are so chosen that the relay 28 will be energized and the upward motion of the contact members $23_a$, $23_b$ and $23_c$ arrested at any desired point in the operation, for example after a predetermined number of increments of motor starting current. The arrangement is preferably such that the interruption occurs at the instant that the motor breaks from rest and starts to rotate.

A second time element device illustrated as an electroresponsive relay 30, the motion of the armature 31 of which is retarded by any suitable means such for example as the oil dash pot 32, serves when energized to deenergize the holding relay 28 and release the plunger from engagement with the pawl 26′ and thus to allow the escapement mechanism and the electromagnetic switching mechanism controlled thereby to resume its operation of adding resistance sections in parallel and increasing the motor current in predetermined increments.

The energization of the operating winding of the relay 30 is also controlled by the contacts 29, $29_a$ and the timing of the oil dash pot 32 is so chosen that the plunger 28 is released a predetermined interval of time after its engagement with the pawl 26′; preferably when the torque developed by the motor 10 is equal to the torque demanded by the motor load.

After the remaining resistance sections have been added in parallel they are all short-circuited by means of a suitable magnetic switching device illustrated in the drawing as an electromagnetic contactor 33 which when operated to its closed position serves to connect the terminals of the motor 10 directly to the source 11 and to interrupt the energization of the operating winding of the contactor 12 so as to allow the latter to descend to its lower or open position.

With the above understanding of the apparatus and its organization in the system the operation of the system itself will readily be understood from the detailed description which follows:

To start the motor 10, the manually operated line switch 34 is first operated to the closed position and the start button 13 is likewise depressed to its closed position in which it completes an energizing circuit for the line contactor 12 which circuit may be traced from the upper supply line 11, through stop button 14, start button 13, operating winding of line contactor 12, conductor 35, interlock 33$_a$ (in the lower position thereof) and thence by conductor 36 to the middle supply line 11. Line contactor 12 in responding to the energization of its operating coil moves to its upper or closed position in which it partially completes the line connections for the motor 10 as far as the resistance units 15, 16 and 17, and in which its upper auxiliary contactor 12$_a$ completes a holding circuit for its operating winding independently of the start button 13 which may now be released. In the closed position of the contactor 12, its lower auxiliary contact 12$_b$ completes the energizing circuit for the operating winding 19 of the electromagnetic switching device 18; this energizing circuit being traced from the line switch 34 through conductor 37, lower auxiliary contact 12$_b$ (in the closed position thereof), conductor 38, operating winding 19, conductor 39 and thence by conductor 35, interlocks 33$_a$ and conductor 36 to the middle supply line 11. The movable core member 20 of the electromagnetic switching device 18 is immediately attracted to its upper position in response to energization of the operating winding 19 and thus placing the resilient spring member 22 under tension. When the tension of the spring 22 increases to a sufficient value the ratchet member 21 and the rod member 23 upon which the movable contacts are carried start to move upwardly. This motion, however, is retarded by the escapement mechanism 24. After a predetermined interval of time, however, the movable contact 23$_a$ (and similar contacts associated with the resistance units 16 and 17) moves into engagement with its cooperating stationary contact thereby completing the connections between the terminals of the motor 10 of the source 11 with the resistance section 15$_a$ included therein. As previously pointed out, the ohmic value of the resistance section 15$_a$ is so chosen that the current which it permits to flow in the motor circuit is limited to a desired amount, as for example, 100 amperes.

The upward motion of the rod 23 continues and after a predetermined time interval which is determined by the spacing between the movable contact carried by this rod and the adjustment of the length of the pendulum 27 of the escapement mechanism, the movable contactor 23$_b$ engages with its cooperating stationary contact to connect the resistance section 15$_b$ in parallel with the resistance section 15$_a$ and thus further to increase the motor current by a predetermined increment, for example another 100 amperes. The interval between these current increments may be adjusted to any value such for example as one-half second or one second or any other desired period.

Assuming now that the motor 10 breaks from rest and starts to rotate when 100 amperes are flowing in its circuit and that the position of the movable contact 29$^a$ has been adjusted so that it engages with its cooperating stationary contacts 29 when the motor starts, the operating winding of the relay 28 will be energized over a circuit extending from the top supply line 11 through switch 34 and conductors 37, 40, contacts 29 and 29$^a$, conductor 41, contacts 31, operating winding of relay 28 and thence by conductors 39, 35, interlock 33$_a$ and conductor 36 to the middle supply line 11. As a result of the energization of the operating winding of relay 28, its movable plunger is attracted against the tension of the spring 28$^a$ and forced into engagement with the pawl 26' of the escapement mechanism thus stopping its timing action and arresting the upward motion of the ratchet 21 and the connecting rod 23 upon which the movable contacts are carried. The motor 10, however, continues to accelerate.

Due to an inherent characteristic of the induction motor 10, the torque of the latter increases as the motor accelerates, up to a point at which maximum torque value is attained and after which a further increase in speed results in a decrease in torque. That is, an induction motor, once it has started to accelerate a load, develops an excess torque which serves to accelerate the load to a point at which the torque demanded by the load is equal to the torque developed by the motor.

At the same time that the locking relay 28 is energized the operating winding of the time element device 30 which is connected in parallel with the operating winding of the holding relay 28 is also energized. After a predetermined interval of time which is determined by the setting of the dash pot 32, the movable contact member 31 is attracted out of engagement with its cooperating stationary contact due to the upward motion of the relay core in response to the energization of its winding thereby deenergizing the operating winding of the holding relay 28. This time interval is preferably chosen so as to occur at that point in the acceleration of the motor 10 when the torque developed by the motor is equal to that demanded by the load i. e. when the speed of the motor has reached a value beyond which it cannot be accelerated without further decreasing the starting resistance.

When the operating winding of the holding relay 28 is deenergized the spring 28$^a$ which has previously been placed under tension withdraws the plunger from engagement with the pawl 26', thereby allowing the escapement mechanism to resume its timing operation and the connecting rod 23 to resume its upward motion.

After a predetermined time interval, the contact member 23$_c$ engages with its cooperating stationary contacts thus adding a resistance section 15$_c$ in parallel with sections 15$_a$ and 15$_b$ and thereby further increasing the speed of the motor 10. As the upward motion of the connecting rod 23 continues, a second adjustable contact finger 42 engages its cooperating stationary contact, after a predetermined interval of time and completes an energizing circuit for the operating winding of contactor 33. This latter circuit is traced from the upper supply line 11 through the stop button 14 as before, and thence through conductor 43, contact 42 (in the closed position thereof) conductor 44, operating winding of contactor 33 and thence by conductor 36 to the middle supply line 11. Contactor 33 in responding to the energization of its operating winding moves to its upper or closed position in which it connects the terminals of the motor 10 directly to the source 11 thereby completely short-circuiting the resistance units 15, 16 and 17. As contactor 33 moves to its closed position, the interlock 33$_a$ interrupts the energizing circuits of line contactor 12 and electromagnetic switching mechanism 18.

In response to the deenergization of their operating coils line contactor 12 and the electromagnetic switching mechanism 18 descend to the lower or open position in which they are illustrated in the drawing. In the closed position of the contactor 33 the interlock 33$_a$ completes a holding circuit for its operating winding independently of the contact 42 so that the contactor 33 remains closed after the contact 42 descends to its open position. Deenergization of time element relay 30 and its operation to the lower or closed position are accomplished when movable contact member 29$_a$ descends out of engagement with stationary contacts 29.

Stopping of the motor is accomplished by depressing the stop button 14 to interrupt the energizing circuit for the operating winding of the contactor 33.

In the modified system of Fig. 2 the time delay device 30 of Fig. 1 is replaced by a current limit relay 45 the operating coil of which is connected across the resistance section 15$_a$ as shown. The remaining elements of the system are identical with those in Fig. 1 as designated by the reference numerals. In operation the plunger of the holding relay 28 is maintained out of engagement with the pawl 26' of the escapement mechanism by means of the spring 28$_a$. As the motor starts from rest and the movable contact member 29$_a$ is actuated into engagement with its cooperating stationary contacts 29 an energizing circuit is completed for the operating winding of the current limit relay 45. The voltage drop across the resistance section 15$_a$ energizes the winding of the relay 45 sufficiently to attract its movable contact member 45$_a$ to its upper or closed position in which it completes an energizing circuit for the operating coil of the locking relay 28, the plunger of which is thereupon attracted and forced into engagement with the pawl 26' of the escapement mechanism. The operation of the escapement mechanism 24 and the upward movement of the connecting rod 23 is interrupted as before. As the speed of the motor 10 increases the current and the voltage drop across the resistance section 15$_a$ decrease correspondingly. When the speed of the motor increases to the point at which the torque developed by the motor is equal to that demanded by the load, the voltage drop across the resistance section 15$_a$ decreases to an amount such that the operating winding of the relay 45 is deenergized, and as a result the movable contact member 45$_a$ descends out of engagement with its cooperating stationary contacts to interrupt the energizing circuit for the operating winding of the holding relay 28. The remainder of the operation of the system is identical with that previously described in connection with the system of Fig. 1.

Although, in accordance with the provisions of the patent statutes, I have described this system in concrete form, I would have it understood that the invention is not limited to the specific apparatus and circuit details described and illustrated since modifications and alterations will readily suggest themselves to persons skilled in the art without departing from the true spirit of this invention or from the scope of the annexed claims.

What I claim as new and desire to secure by Letters Patent of the United States, is:

1. A motor starter comprising means for varying the motor current from zero value to a starting value for said motor in a series of steps, means for arresting the action of said current varying means after the current has been increased to said starting value to provide for acceleration of said motor from rest to an intermediate speed, and means for subsequently activating said current varying means to accelerate said motor to full speed.

2. A motor starter comprising means for increasing the motor current from zero to a starting value for said motor in a series of substantially equal increments, means for arresting the action of said current increasing means when the motor current reaches said starting value to provide acceleration of said motor from rest to an intermediate speed, and means for activating said current increasing means after a time interval to effect acceleration of said motor to full speed.

3. A motor starter comprising means for varying the current from zero to starting value in a series of steps of substantially equal increments, a time delay device for effecting a definite time interval between said steps and for arresting the action of said current varying means after a predetermined time interval, and means for subsequently releasing said arresting means.

4. A motor starter comprising in combination a variable starting resistance having an ohmic value sufficient to limit the current to a value materially less than the starting current for said motor, a device for varying said resistance in a series of substantially equal steps to increase the motor current from zero to said starting value in a series of substantially equal increments, a time element device for insuring a predetermined time interval between said steps, means for arresting the action of said resistance varying means when the motor starts to rotate to provide for acceleration to an intermediate speed, and means for reactivating said resistance varying means after a predetermined interval of time.

5. In a motor starting system, an electric motor, means operable to vary the motor current from zero to the starting value in a series of substantially equal increments, time element means for causing said current varying means to provide substantially equal time intervals between succeeding current increments, means for stopping the action of said current varying means substantially when said motor starts and means for restarting the operation of said current varying means at a predetermined point in the acceleration of said motor.

6. A motor starting system comprising an electric motor, means for varying the current of said motor from zero to the starting value in a series of substantially equal increments, time element means for effecting substantially equal time intervals between successive increments, means for stopping the operation of said current varying means after said current has been increased to starting value, and time element means for restarting the operation of said current varying means a predetermined interval of time after the stopping thereof.

7. A motor starting system comprising an electric motor, means for varying the motor current from zero to starting value in a series of predetermined increments, time element means for providing substantially equally time intervals between said increments, means for stopping the operation of said current varying means when said motor starts thereby to provide for acceleration to an intermediate speed with said current varying means inactive, and means responsive to a predetermined motor current for restarting the operation of said current varying means.

8. A motor starting system comprising an electric motor, switching means and a variable resistance controlled thereby for increasing the motor current to the starting value in a series of substantially equal increments, time element means for controlling said switching means to effect substantially equal time intervals between said increments, means for stopping the action of said switching means substantially when said motor starts, and time element means for restarting said switching means a predetermined interval of time after the stopping thereof.

9. A motor starting and accelerating system comprising an alternating current motor, a variable resistance for limiting the current admitted to the motor to a value materially less than the starting value, a switching device for varying said resistance in steps to provide a series of substantially equal motor current increments, a time element device for introducing substantially equal time intervals between said increments, an electromagnetic relay device responsive to operation of said switching device for arresting the action of said switching device when said motor starts thereby to provide acceleration of said motor by the excess torque thereof, and means responsive to the motor current for restarting said switching device at a predetermined point in the acceleration of said motor so as to provide further operation of said switching device to accelerate said motor to full speed.

10. A motor starting system comprising an electric motor, a variable resistance for limiting the motor starting current, a switching device for varying said resistance in steps to provide a series of increments in the motor starting current, a pendulum escapement time element device for retarding the action of said switching device and providing substantially equal time intervals between said increments, a control device on said switching device and an electromagnetic relay operated thereby for locking said time element device after a predetermined number of increments thereby to lock said switching device against further operation, a second time element device set in operation by said switching device for releasing said first mentioned time element device and switching device a predetermined interval of time after the operation of said relay so as to provide for further operation of said switching device to accelerate said motor to full speed.

11. In a motor starting and accelerating system, a source of alternating current, an alternating current motor, a variable current limiting resistance, means comprising a manually operated switch and a contactor controlled thereby for connecting said motor to said source with said resistance in circuit, switching means responsive to operation of said contactor for varying said resistance in steps to provide motor current increments of substantially equal value, a pendulum escapement time element device for retarding the action of said switching means so as to introduce substantially equal time intervals between said increments, an adjustable contact device on said switching means and an electromagnetic relay device controlled thereby for locking said time element device thereby to interrupt the action of said switching means substantially when said motor starts from rest, a second time element device responsive to operation of said switching means for releasing said first mentioned time element device and said switching means a predetermined interval of time after the interruption of operation of said switching means, thereby to provide acceleration of said motor to full speed, and means comprising a second contactor responsive to operation of said switching means for connecting said motor directly to said source.

12. A motor starting and accelerating system comprising a source of alternating current, an alternating current induction motor, a variable current limiting resistor, means comprising a manually operated push button and a contactor controlled thereby for connecting said motor to said source with said resistance in circuit, a switching device for varying said resistance in steps so as to provide a series of substantially equal motor current increments, a pendulum controlled escapement time element device for retarding the action of said switching device and introducing predetermined time intervals between said increments, an adjustable contact device responsive to operation of said switching device and an electroresponsive relay locking device controlled thereby for locking said time element device and said switching device when said motor starts from rest, to provide acceleration of said motor by its excess torque, means responsive to the current of said motor for releasing said first mentioned time element device and switching device when the motor torque equals the torque demanded by the load thereby to provide further operation of said switching device to accelerate said motor to full running speed, and a second contactor responsive to operation of said switching device for connecting said motor directly to said source.

In witness whereof, I have hereto set my hand.

CARLISLE N. McDAVITT.